United States Patent [19]
Crane et al.

[11] 3,795,318
[45] Mar. 5, 1974

[54] CONTROL OF ULTRAFILTRATION RATES DURING HEMODIALYSIS WITH HIGHLY PERMEABLE MEMBRANES

[75] Inventors: Robert A. Crane, Walnut Creek; Benjamin J. Lipps, Concord; John A. Sargent, Berkeley, all of Calif.

[73] Assignee: The Dow Chemical Company, Midland, Mich.

[22] Filed: May 26, 1972

[21] Appl. No.: 257,450

[52] U.S. Cl. .............................................. 210/321
[51] Int. Cl. ........................................... B01d 31/00
[58] Field of Search ..................... 210/101, 22, 321

[56] References Cited
UNITED STATES PATENTS

| | | | |
|---|---|---|---|
| 3,722,680 | 3/1973 | Smith | 210/321 X |
| 3,373,876 | 3/1968 | Stewart | 210/321 |
| 3,506,126 | 4/1970 | Serfass et al. | 210/321 X |

*Primary Examiner*—Frank A. Spear, Jr.
*Attorney, Agent, or Firm*—J. Roger Lochhead

[57] ABSTRACT

A system for carrying out hemodialysis with high flux membranes without incurring the risk of excessive ultrafiltration rates or reverse ultrafiltration is disclosed. The transmembrane pressure differential is held constant, despite changes in pressure on the blood side of the membrane. The actual differential is sensed, compared to a desired positive magnitude and the pumping rate of a positive displacement, discharge pump adjusted to alter the proportion of the dialysate which passes through a restricted shunt path around the pump, thereby altering the back-pressure on the dialysate side of the membrane until the differential has the desired magnitude.

6 Claims, 2 Drawing Figures

CONTROL OF ULTRAFILTRATION RATES DURING HEMODIALYSIS WITH HIGHLY PERMEABLE MEMBRANES

The invention described herein was made in the course of, or under, a contract with the Department of Health, Education and Welfare.

BACKGROUND OF THE INVENTION

In any ordinary hemodialysis operation it is desirable to avoid reverse ultrafiltration, — i.e., transfer of fluid through the membrane from the dialysis solution to the blood. This cannot occur so long as the average pressure on the blood side exceeds the pressure on the dialysate side by an amount at least equal to the "oncotic" pressure (the net osmotic pressure due to the difference in blood and dialysate compositions).

It is also desirable in any hemodialysis to control the rate of ultrafiltration. The pressure on the blood side of the membrane can vary, for any of several reasons, over a relatively large range in the course of a dialysis. Corresponding changes in the ultrafiltration rate result from such variations. If the dialysis membrane has a low water permeability, the absolute magnitude of variations in ultrafiltrate quantity will be small and serious consequences to the patient will result only over a relatively prolonged dialysis period. However, with the much more permeable membranes now contemplated for use, higher rates of water removal per unit area of membrane can result.

If a dialysis device is used in which the membrane is not only highly permeable but also is large in area, an intolerably high absolute rate of water removal from the patient can result if some advance provision is not made for counteracting fluctuations in pressure on the blood side of the membrane.

SUMMARY OF THE INVENTION

The invention is a hemodialysis system comprising the combination of a membrane dialyzer; a constant volume dialysate feed means; a variable speed, positive displacement dialysate discharge pump; restricted conduit means as a shunt around the discharge pump; means for sensing the difference between the blood outlet pressure and a pressure on the dialysate side of the membrane; and means for regulating the speed of the discharge pump to maintain the sensed pressure difference at a preselected value.

DETAILED DESCRIPTION OF INVENTION

Figure 1:
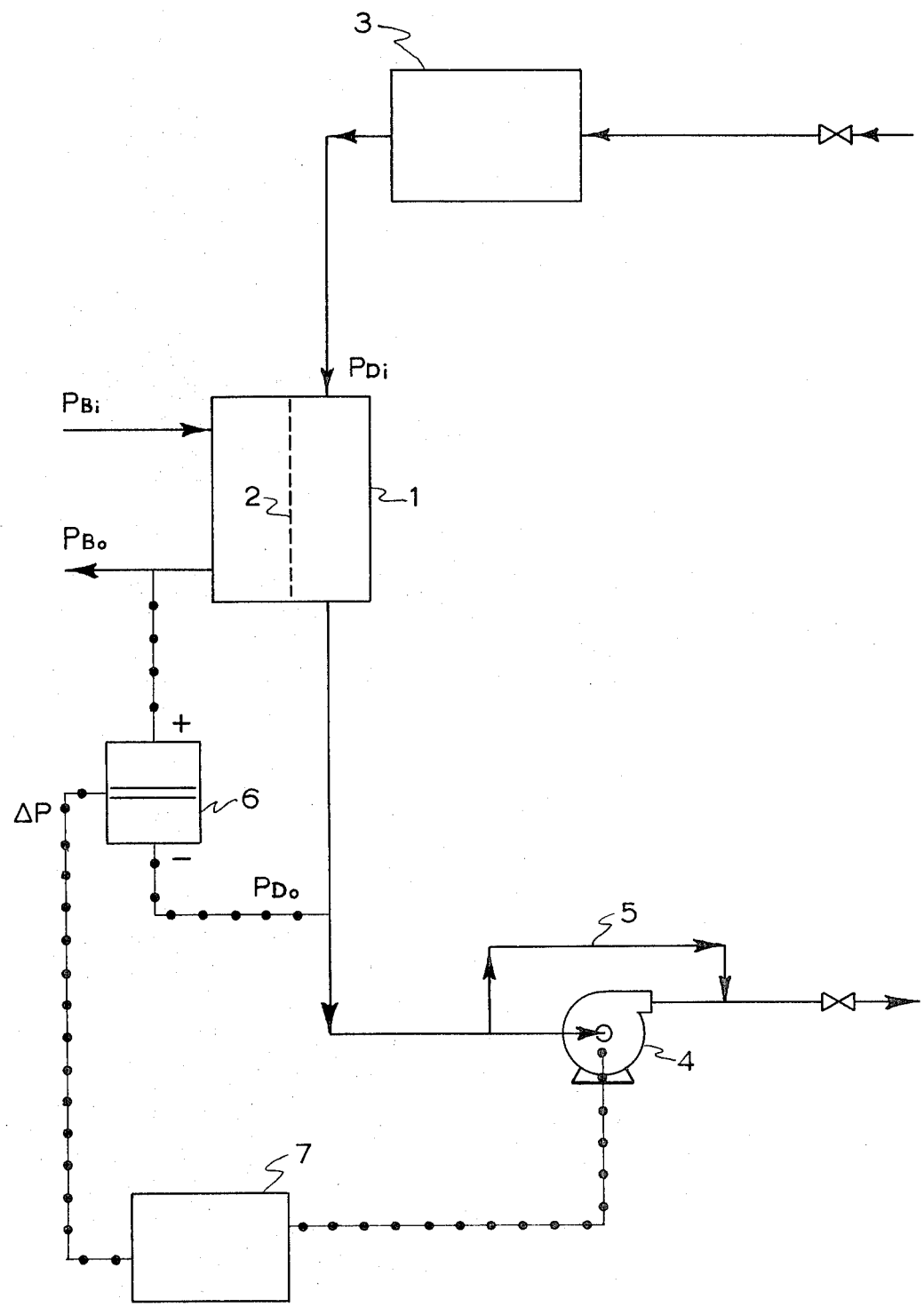

Referring to FIG. 1 of the drawings, blood is supplied to a hemodialysis device 1 at an inlet pressure $P_{Bi}$, passed through the device in contact with one side of a highly permeable membrane 2 and discharged at an outlet pressure $P_{Bo}$. Dialysis solution is introduced to the device at an inlet pressure $P_{Di}$ by a constant volume feed means 3, passes through in contact with the opposite side of the membrane and exits from the device at a volume rate $Q_D$. The exiting dialysate stream then divides between two paths in parallel.

One path is through the displacement volume $V_p$ of a variable speed, positive displacement pump 4 operated at a rate of n pumping cycles per unit time. The volume rate of dialysate flow through this path is $Q_p = nV_p$.

The other dialysate path is a shunt around the displacement volume of the pump through a restricted conduit means 5, through which the volume rate of flow is $Q_s = Q_D - Q_p$. The pressure $P_{Do}$, at the point of exit of dialysate from the device 1, is determined by the magnitude of $Q_s$, the fraction of the dialysate forced to pass through the shunt path.

The magnitude and sign of a pressure differential, such as $P_{Bo}-P_{Do}$, is sensed by a means 6 and the speed of pump 4 is adjusted as necessary by controller 7 to maintain the sensed differential at a preselected value.

So long as $Q_D$ is constant, the pressure drop ($\Delta P_D = P_{Di} - P_{Do}$) experienced by the dialysate in passing through the dialysis device is constant. However, changes in $P_{Do}$ caused by controller 7 will be reflected to the constant volume feed means and $P_{Di}$ will vary in parallel with $P_{Do}$. Thus, the absolute value of the average pressure, $\bar{P}_D = (P_{Di} + P_{Do}) \div 2$, can be varied without changing $Q_D$ or $\Delta P_D$.

In FIG. 1, blood and dialysate are shown in co-current flow through the dialyzer. However, the flows can be countercurrent. In the latter event, it is generally better to base control on the differential $P_{Bo} - P_{Di}$.

Hemodialysis device

The hemodialysis device is any such device capable of ultrafiltering at least 0.05 cc. of water per minute per mm of Hg transmembrane pressure differential ($\bar{P}_B - \bar{P}_D$). Preferably, it is a device having an effective membrane area of at least 1 square meter. Particularly preferred are hollow fiber devices affording at least one square meter of effective membrane area per 100 ml. of blood priming volume.

Constant Volume Feed Means 3

The constant volume feed means can be any means capable of delivering a desired constant volume of dialysate within a selected range against the maximum contemplated back pressure, $P_{Di}$. Such means are, for example, constant speed pumps or the combination of a flow controller with a suitable variable speed pump. A preferred means is a positive displacement pump provided with a relief check and operated in conjunction with a flow controller at a rate such that more than the required volume of dialysis solution is pumped against the controller, the excess being returned to the pump intake through the relief check.

Discharge Pump 4 and Conduit Means 5

The discharge pump can be any variable speed positive displacement pump means of suitable operating characteristics. The restricted conduit means 5 is simply a closed-wall (as contrasted to a trough) conduit means. It may be adjustable in cross-section or length but should not vary in its resistance to a given flow between adjustments. It may be a separate pipe, as shown in FIG. 1, or may consist of the slip path between the fixed and moving parts within the discharge pump itself. Since no actual pump can have zero slippage, the combination of a pump and an external conduit constitutes three parallel flow paths. However, the slip path in the pump and the external conduit together constitute a conduit means 5 of slightly less resistance to flow than the external conduit alone. In either case, the discharge stream of dialysate passes as two portions through a fixed and a variable resistance to flow in parallel. If a separate external conduit is not employed, then a pump with greater slippage will generally be required.

The more restricted the shunt path through conduit means 5, the greater will be the effect on $P_{Do}$ of a given change in pump speed ($n$). The larger $Q_D$ is relative to $V_p$, the more the pump speed must be changed to cause a given change in $P_{Do}$. Accordingly, the discharge pump speed should be variable over a relatively wide range and the pump displacement should be small enough relative to the contemplated normal magnitude of $Q_D$ that the pump will be operating at about the midpoint of its speed range when $Q_p = Q_D$.

Means 5 should not be so restricted that a small change in pump speed will make a large change in $P_{Do}$, but must be restricted enough so that the maximum anticipated magnitude of $P_{Do}$ can be maintained at a value of $n$ above the lowest operable pump speed. So long as $n$ is finite, $P_{Do}$ can be increased by slowing down the pump, and control is retained. When $n = 0$ (pump stopped), all of $Q_D$ must go through means 5 and the only way to alter $P_{Do}$ is by a corresponding change in $Q_D$. When $n$ is so high that $Q_p = Q_D$, the flow through means 5 is nil and the pump will exert a suction if $n$ is further increased. This is desirable in some applications, and it is a distinct advantage of the present invention that control can be extended into the region of negative values of $P_{Do}$ (or $\overline{P}_D$).

Sensor Means 6

The sensor means can be any means capable of developing and transmitting to the controller a signal proportional to the magnitude of $P_{Bo} - P_{Do}$ (or $P_{Bo} - P_{Di}$). In FIG. 1, the sensor is shown as a single differential transducer, described in more detail subsequently herein. However, a suitable alternative is a digital transducer system such as that disclosed in U.S. Pat. No. 3,595,084. In the latter system, two separate, pressure-variable capacitive sensors are used to sense the pressures on opposite sides of the membrane.

Control Means 7

The control means can be any means capable of developing and transmitting to the power source of pump 4 a speed modifying input proportional to the difference between the signal received from the sensor means 6 and a set-point voltage, current or pressure. A specific means is described in more detail subsequently herein.

OVERALL FUNCTIONING OF THE SYSTEM

The overall functioning of the system can be exemplified with regard to a preferred embodiment in which the hemodialyzer component comprises a membrane in hollow fiber form. In this application, the blood is circulated through the lumen of the fibers and the dialysis solution is passed around and between the fibers.

Figure 2:
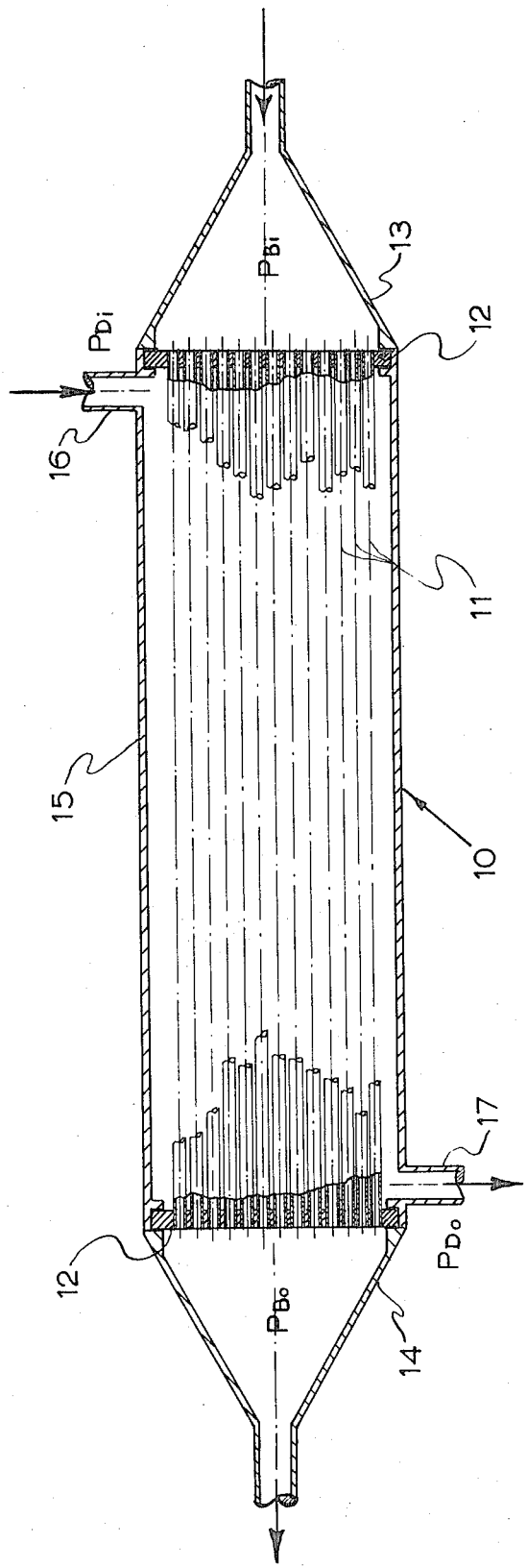

The essential elements of a typical "hollow fiber artificial kidney" or dialyzer are illustrated (not to scale) in FIG. 2. The dialyzer 10 comprises a bundle of about ten thousand closely spaced, parallel hollow fiber lengths 11. These lengths pass through a polyurethane tube sheet 12 at each end and communicate with inlet 13 and outlet 14 headers. The fiber bundle/tube sheet assembly is sealed in a surrounding plastic jacket 15 having a dialysate inlet 16 and outlet 17.

The fibers are suitably cellulose diacetate fibers made in accordance with U.S. Pat. No. 3,532,527. Their effective lengths in the dialyzer are about 16.5 cm; they have an inner diameter of about 200 microns and a wall thickness of about 40 microns. The total effective membrane area of the dialyzer is about 1 square meter. At 37°C. this unit will pass about 0.1 cc. per minute of ultrafiltrate per millimeter of Hg net transmembrane pressure (average blood-side pressure less the sum of the average dialysate-side pressure and oncotic pressure).

In typical operation, the dialysis solution flow rate is held at 500 cc/minute and the blood flow can vary from 120 to 250 cc/minute. Table 1 following shows typical blood side operating conditions:

TABLE I

| Condition | $Q_B$ | $P_{Bi}$ | $P_{Bo}$ | $\Delta P_B$ | $\overline{P}_B$ |
|---|---|---|---|---|---|
| I | 250 | 152 | 120 | 32 | 136 |
| II | 200 | 125 | 100 | 25 | 112.5 |
| III | 160 | 100 | 80 | 20 | 90 |
| IV | 140 | 65 | 47 | 18 | 56 |
| V | 120 | 52 | 40 | 12 | 46 |

If $P_{Bo} - P_{Do}$ is held constant at a value C, as in the present system, the dialysate side conditions are determined by the selected value of C and by $\Delta P_D$. That is, $P_{Do} = P_{Bo} - C$ and $P_{Di} = P_{Do} + \Delta P_D$. For the latter quantity, $\Delta P_D$, a range of from about 5 to 7 mmHg is typical.

In a convenient mode of operation, a value of C is selected such that $C = \Delta P_D/2 +$ (Oncotic pressure). This ensures that any increase in blood-side pressures due to clotting will not effect the ultrafiltration rate. So long as the normal blood flow rate can be maintained (as by pumping) the ultrafiltration rate will hold at a value dependent on the normal or "initial" average blood-side pressure. If a higher rate of ultrafiltration is to be held independently of clotting effects, the nominal average pressure on the blood side must be increased (by pumping more blood per unit time). However, the value of C will *not* be increased unless $\Delta P_D$ is also increased, as by increasing the dialysate flow rate, for example.

Example

The control system of the present invention was used to limit ultrafiltration in a clinical investigation of the effect of higher molecular weight solute removal during blood dialysis with highly permeable hollow fibers. In this example, the flows were counter-current and control was based on the differential $P_{Bo} - P_{Di}$.

The 11 "kidney" units used in this investigation were of the type shown in FIG. 2 and each contained 9,480 cellulose acetate fiber lengths having an internal diameter of 200 microns. The effective membrane area was from 0.86 to 0.98 square meters per unit.

All clearance studies were conducted with a blood flow of 200 ml/min and a dialysate flow of 500 ml/min. Clearances for urea, uric acid, creatinine, inulin and vitamin $B_{12}$ (in vitro) were determined.

Clotting ranged from 0 to 5 percent occlusion. The average value of oncotic pressure was 25.4 mm Hg. and the ultrafiltration rate was readily controlled at 0.1 (Pm-25.4) cc/minute (Pm is mean transmembrane pressure, or $\overline{P}_B - \overline{P}_D$). Eleven runs of from 1 to 6 hours duration were made and it was found that the ultrafiltration rate dropped somewhat during the first 30 minutes of dialysis but thereafter stabilized and could be held at any desired level within the tested range of −2 to 25 ml/minute. The average clearances, in ml/min, were: Urea, 135; Creatinine 110; Uric Acid 96; Vitamin $B_{12}$, 56 and Inulin 24. The protein loss, in milligrams per minute, was found to be 0.53 (ultrafiltration rate + 4.14).

Thus, ultrafiltration was readily controlled, despite considerably higher than normal clearances of solutes in the 1,300 to 1,500 molecular weight range in conjunction with a controllable 4 to 40 percent increase in clearance in the 60 to 160 molecular weight range.

The dialysate feed and discharge pumps used were MICRO-TROL seal-less gear pumps supplied by Micropump Corp., Concord, Calif.

In these units the pumps are magnetically coupled to continuously variable D.C. motors. The feed pump was a model 12-41-316 capable of supplying 500 cc/min of dialysate against a pressure head of 155 mmHg (12 volt motor) or 310 mmHg (28 volt motor) and provided with an internal, spring-loaded relief by-pass. The discharge pump was a similar pump but with the internal by-pass blocked. The conduit means 5 — FIG. 1 — consisted of the slippage path within the discharge pump and was restricted enough to hold a back pressure of at least 100 mmHg on the dialyzer discharge while passing 500 cc. of dialysate (through slippage and displacement volume in parallel) per minute.

A commercially available flow controller was used in conjunction with the feed pump (between the pump and the dialyzer inlet). This controller maintains flow control by varying the pressure drop across a variable orifice which is varied by a piston coupled to a pressure sensing diaphragm.

The sensor means 6 — FIG. 1 — was a Differential Transducer, Pace Model KP 15, supplied by the Pace Engineering Company of North Hollywood, Calif. For convenience, a Pace Model CD 25 differential pressure meter — which gives a visual indication of the differential value — was used to transmit the transducer output to the controller 7 — FIG. 1.

The controller used was essentially an electronic servo system as described in U.S. Pat. No. 3,493,828.

We claim:

1. A hemodialysis system comprising a. a hemodialysis device comprising a dialysis membrane capable of passing at least 0.05 cc of ultrafiltrate per minute per millimeter of Hg transmembrane pressure differential;
   b. feed means adapted to introduce dialysis solution to said hemodialysis device at a preselected constant volume rate ($Q_D$) and at an inlet pressure $P_{Di}$;
   c. a variable speed, positive displacement discharge pump adapted to receive dialysate from said device at an outlet pressure $P_{Do}$, said pump having a displacement volume $V_p$ and being adapted to displace therethrough dialysate at a volume rate $Q_p = nV_p$, n being displacements per unit time;
   d. restricted conduit means adapted to shunt dialysate around said displacement volume at a volume rate $Q_s = Q_D - Q_p$, determinative of said pressure $P_{Do}$; and
   e. control means for sensing the magnitude of the difference between the pressure at which blood is discharged from said device and a dialysateside pressure therein, said control means being adapted to adjust n to maintain said difference at a preselected value.

2. The system of claim 1 in which the dialysis feed means is the combination of a flow controller and a pump.

3. The system of claim 1 in which the dialysis membrane is in the form of fine hollow fibers so disposed in the hemodialysis device that blood passes through the lumen of the fibers and dialysis solution passes around the exterior surfaces of the fibers.

4. The system of claim 1 adapted to pass blood and dialysate co-currently through said dialysis device.

5. The system of claim 4 wherein said preselected value is equal to the sum: ($P_{Di} - P_{Do}$) + oncotic pressure.

6. The system of claim 1 adapted to pass blood and dialysate in counter-current flow through said dialysis device.

* * * * *